United States Patent

Kawakami

[11] Patent Number: 5,458,018
[45] Date of Patent: Oct. 17, 1995

[54] SPEED INDICATOR FOR A SHIFTING DEVICE OF A BICYCLE

[75] Inventor: Tatuya Kawakami, Sakai, Japan

[73] Assignee: Shimano Inc., Osaka, Japan

[21] Appl. No.: 123,219

[22] Filed: Sep. 20, 1993

[30] Foreign Application Priority Data

Sep. 21, 1992 [JP] Japan .................. 4-250840

[51] Int. Cl.⁶ .................. F16C 1/10
[52] U.S. Cl. .................. 74/502.2; 74/500.5
[58] Field of Search .................. 74/500.5, 501.5 R, 74/502.2, 502.6, 506, 489; 474/80; 116/321, 323, 324, 337, 28.1, 37, 306, 28 R

[56] References Cited

U.S. PATENT DOCUMENTS

| 3,524,979 | 8/1970 | Cohen . | |
|---|---|---|---|
| 4,728,316 | 3/1988 | Darby | 474/80 |
| 4,995,280 | 2/1991 | Tagawa | 74/502.2 X |
| 5,052,241 | 10/1991 | Nagano . | |
| 5,134,897 | 8/1992 | Romano | 74/502.2 X |
| 5,178,033 | 1/1993 | Kund . | |
| 5,203,213 | 4/1993 | Nagano | 74/502.2 X |
| 5,325,735 | 7/1994 | Nagano | 74/502.2 |

FOREIGN PATENT DOCUMENTS

| 2673594 | 9/1992 | France . |
| 3215426 | 10/1983 | Germany . |

Primary Examiner—Charles A. Marmor
Assistant Examiner—Peter Kwon
Attorney, Agent, or Firm—Dickstein, Shapiro & Morin

[57] ABSTRACT

A shifting apparatus for a bicycle includes a takeup element for winding a change speed wire, a shifting device having shift levers for rotating the takeup element, a speed indicator formed separately from the shifting device and attached to a handlebar, and an interlocking wire for transmitting a displacement of the shifting device to the speed indicator.

16 Claims, 5 Drawing Sheets

SPEED INDICATOR FOR A SHIFTING DEVICE OF A BICYCLE

BACKGROUND OF THE INVENTION

1. Field of the Invention

The present invention relates to a speed indicator for indicating speeds selected by a shifting device of a bicycle.

2. Description of the Related Art

Some conventional bicycles have a speed indicator provided for a shifting device per se for indicating speeds selected by the shifting device. Such an indicator, depending on the position of the shifting device relative to the handlebar, could not easily be seen by the rider.

SUMMARY OF THE INVENTION

An object of the present invention is to provide a speed indicator easily seen by the rider regardless of the position of the shifting device relative to the handlebar.

Another object of the present invention is to provide a compact speed indicator.

The above objects are fulfilled, according to the present invention, by a shifting apparatus for a bicycle comprising a shifting device including a takeup member for winding a change speed wire thereon, and shift levers for rotating the takeup member; a speed indicator formed separately from the shifting device and attached to a handlebar; and an interlocking device for transmitting a displacement of the shifting device to the speed indicator.

The above construction allows the speed indicator to be attached to a position of the handlebar easily seen by the rider of the bicycle at all times regardless of the position of the shifting device relative to the handlebar.

Further and other objects, features and effects of the invention will become more apparent from the following more detailed description of the embodiments of the invention taken with reference to the accompanying drawings.

DETAILED DESCRIPTION OF THE PREFERRED EMBODIMENTS

Figure 1:
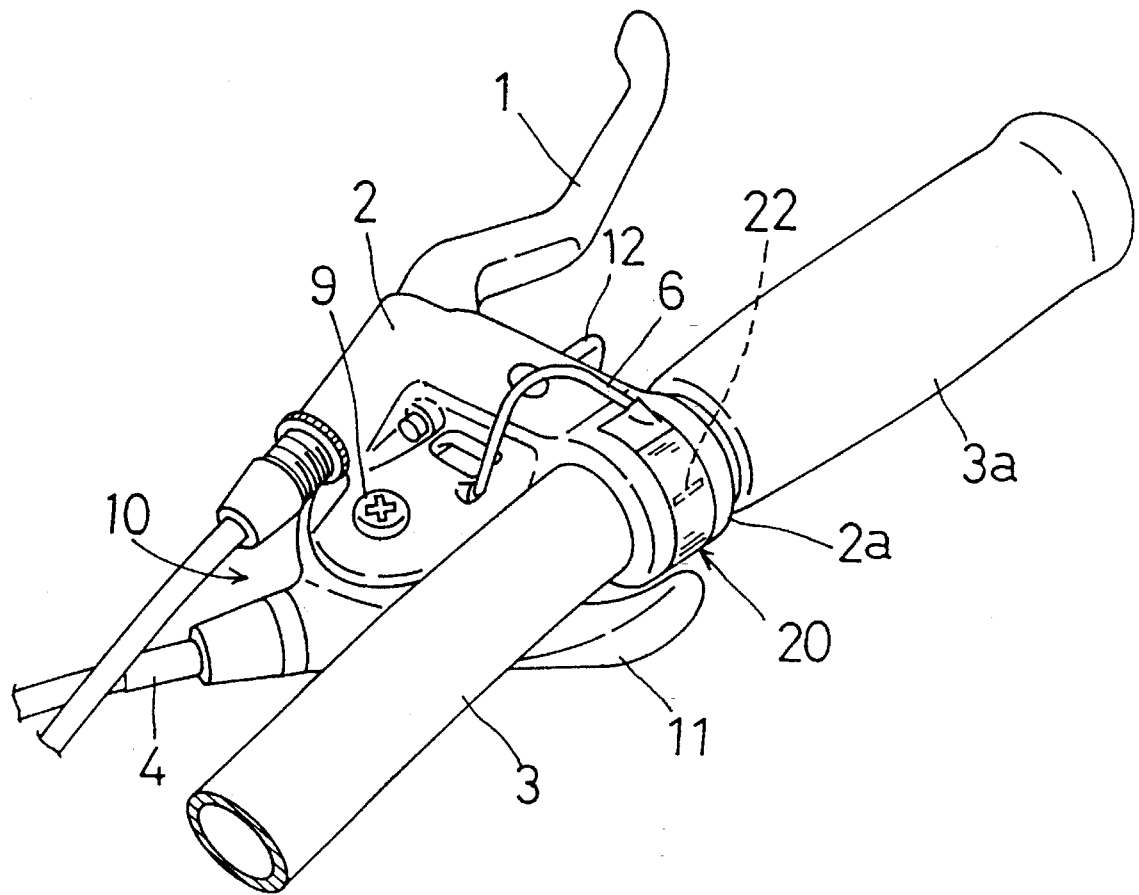
FIG. 1 is a perspective view of a speed indicator for a shifting device of a bicycle according to the present invention.
Figure 2:
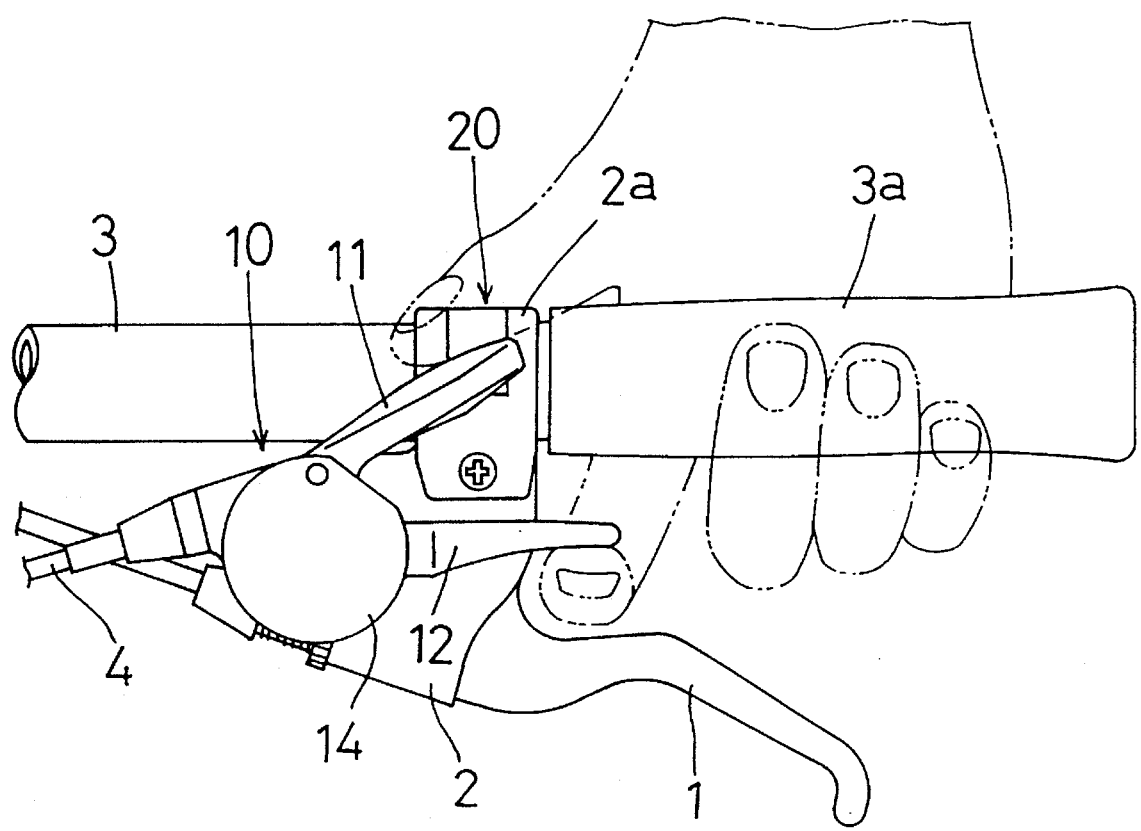
FIG. 2 a bottom view of the shifting device shown in FIG. 1.

As shown in FIGS. 1 and 2, a brake lever device with a shifting device of a bicycle includes a brake lever 1 pivotably supported by a lever bracket 2, and two shift levers 11 and 12 also supported by the lever bracket 2.

The shifting device includes a shifter 10 having the shift levers 11 and 12, and the lever bracket 2. The lever bracket 2 is used also as a member for securing the shifter 10 to a handlebar 3. The shift levers 11 and 12 are pivotable to pull or relax a change speed wire 4.

Figure 3:
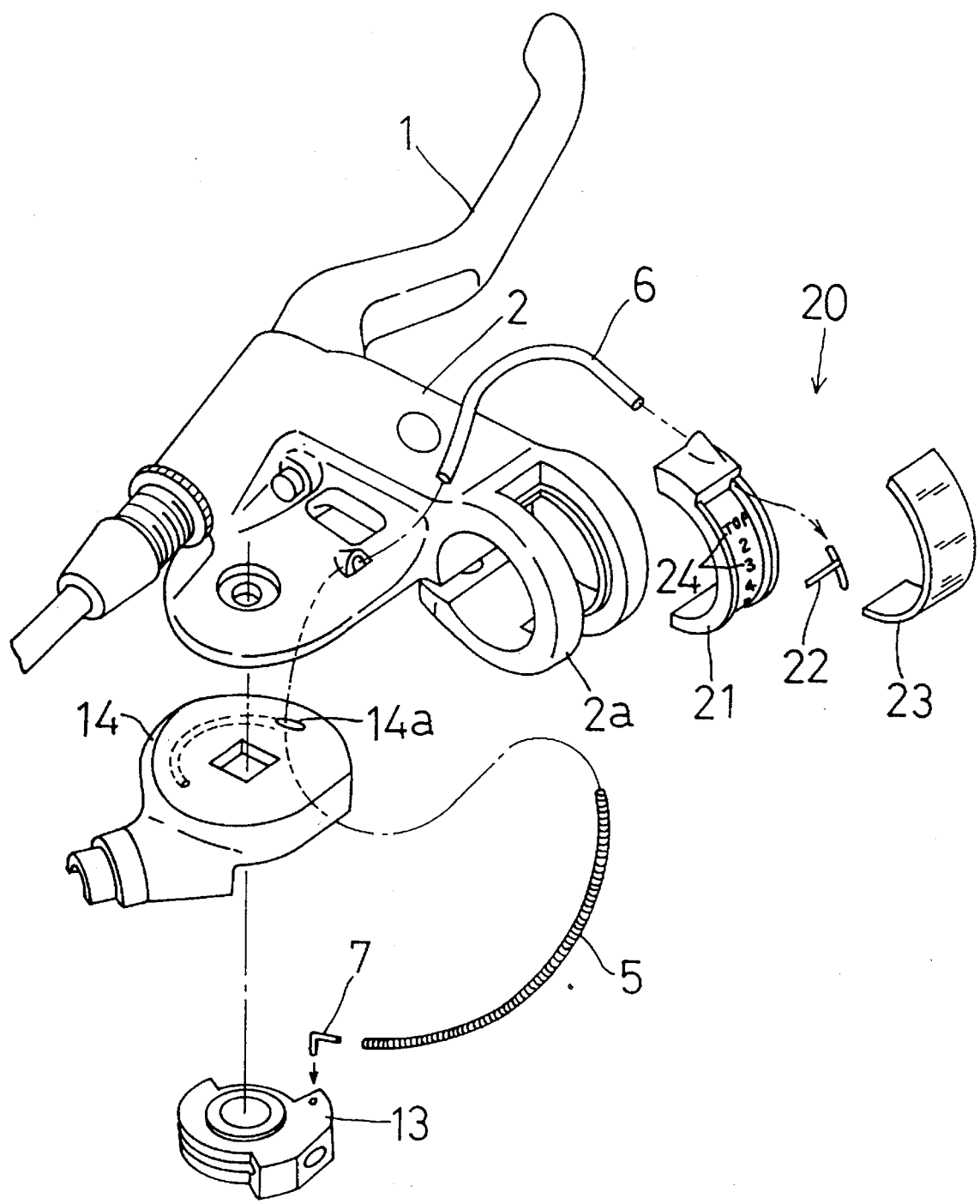
FIG. 3 is an exploded perspective view of the shifting device and speed indicator shown in FIG. 1.

Specifically, the shifter 10 includes the shift levers 11 and 12, a takeup element 13, as shown in FIG. 3, to which the change speed wire 4 is connected, and a case 14 for pivotably supporting the shift levers 11 and 12 and rotatably supporting the takeup element 13. The case 14 is attached to the lever bracket 2 by a mounting screw 9, and the lever bracket 2 is fixed tight to the handlebar 3 by a mounting band 2a. Thus, the lever bracket 2 for supporting the brake lever 1 is used to secure the shifter 10 to the handlebar 3.

The ease 14 houses an interlock mechanism (not shown) for interlocking the shift levers 11 and 12 to the takeup element 13. The interlock mechanism includes a feed pawl (not shown) for transmitting drive from an operated one of the shift levers 11 and 12 to the takeup element 13 to rotate the latter in a wire winding direction, a stopper pawl (not shown) for stopping the takeup element 13 rotating in a wire unwinding direction under tension of the change speed wire 4 or the like, a pawl controller (not shown) operable in response to an operation of the other shift lever 11 or 12 to retract the stopper pawl and allow the takeup element 13 to rotate in the unwinding direction under tension of the change speed wire 4 or the like and to restore the stopper pawl with a rotation through each predetermined angle of the takeup element 13. Thus, by operating the shift lever 11 or 12, the takeup element 13 is rotatable to wind or unwind the change speed wire 4, thereby to shift a front or rear derailleur to a desired speed stage.

The shifter 10 is attached to the lever bracket 2 such that the shift levers 11 and 12 are located below the mounting band 2a. Consequently, with the shifter 10 attached to the handlebar 3, the shift levers 11 and 12 are located below the handlebar 3. With this arrangement, the shift levers 11 and 12 are within easy reach of the thumb and finger of a hand holding a grip 3a of the handlebar 3. The rider can carry out a shifting operation while firmly holding the grip 3a.

As shown in FIG. 1, a speed indicator 20 is formed separately from the shifter 10, and mounted on the mounting band 2a of the lever bracket 2. The indicator 20 is interlocked to the shifter 10 through a cable 5 in the form of a coil spring as shown in FIG. 3. The rider may readily confirm speed stages selected by the shifting device despite the manner in which the shifter 10 is attached to the handlebar 3. The indicator 20 preferably has a scale panel facing rearwardly or upwardly and rearwardly of the mounting band 2a.

Specifically, as shown in FIG. 3, the indicator 20 includes a scale panel 21, a pointer 22 and a transparent cover plate 23. As shown in FIG. 5, the pointer 22 has opposite ends thereof slidably fitted in a pair of guide grooves 21a and 21b formed in the scale panel 21. Thus, the pointer 22 is slidable along the guide grooves 21a and 21B between a surface of the scale panel 21 and the cover plate 23 curved into a semicircular shape. The pointer 22 selectively points to a plurality of speed marks 24 printed or otherwise shown in numerals or signs on the scale panel 21. As seen from FIGS. 3 and 4, the scale panel 21 has a substantially semicircular shape extending circumferentially of the handlebar 3. The scale panel 21 may be snapped on or, though not shown in the drawings, detachably attached by screws or the like or rigidly fixed to the mounting band 2a. The pointer 22 is T-shaped as a whole, and may be formed of a soft material such as plastic or vinyl or of a metal such as aluminum or steel. To be visible at night, the pointer 22 may be coated with a fluorescent paint or formed of vinyl including a fluorescent substance. Alternatively, the speed marks 24 may be formed of a fluorescent paint.

Figure 4:
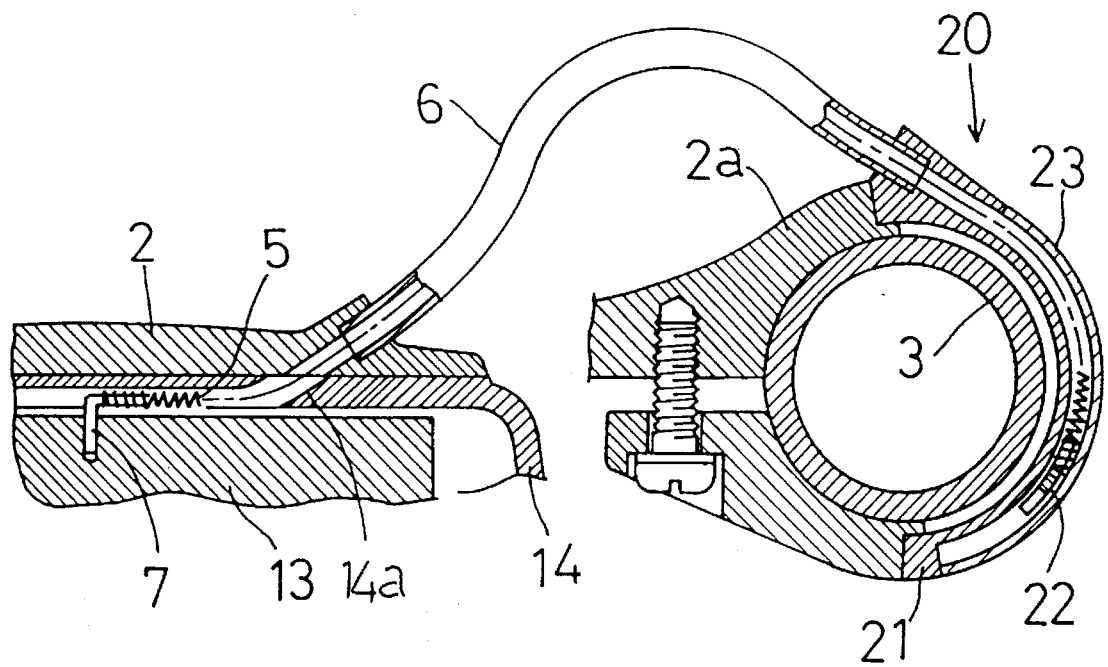
FIG. 4 is a sectional side view of the speed indicator and relevant parts of the shifting device.
Figure 5:
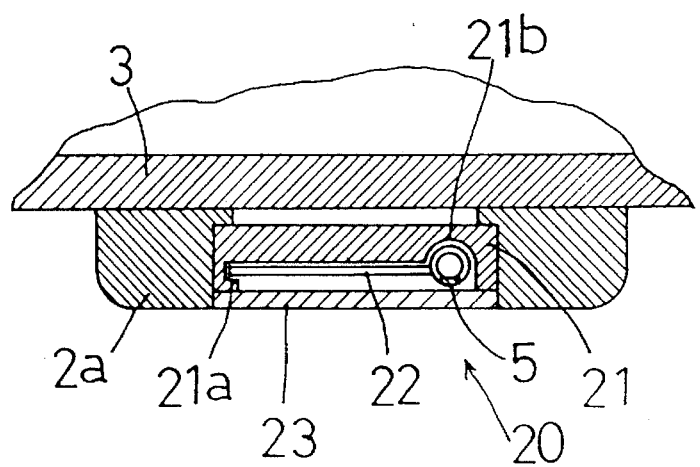
FIG. 5 is a sectional bottom view of the speed indicator.

As seen from FIG. 4, the interlock cable 5 extends between the shifter 10 and indicator 20 through a cable passage 6 in the form of a pipe between the scale panel 21 and lever bracket 2, and through a cable receiving bore 14a formed in the case 14. In this embodiment and another embodiment described later, a thin coil spring is used as the interlock cable 5, but a flexible material such as plastic or rubber may be used instead. The cable passage 6 may be formed of a soft material such as vinyl or plastic, or a metal such as aluminum or steel to provide enhanced protection for the cable 5. The shifter-end of the cable 5 is connected to the takeup element 13 by means of an L-shaped metal coupling 7, while the indicator-end of the cable 5 is connected to one end of the pointer 22. With rotation of the takeup element 13, the cable 5 is slidable through the cable receiving bore 14a and cable passage 6 to slide the pointer 22. In this way, the speed indicator 20 is interlocked to the takeup element 13 through the cable 5 to be operable in response to operation of the shift levers 11 and 12.

Specifically, when the shift lever 11 or 12 is manipulated in a shifting operation, rotation of the takeup element 13 and interlocking action of the cable 5 cause the pointer 22 of the indicator 20 to point to one of the speed marks 24. From the speed mark 24 indicated by the pointer 22, the rider can grasp a speed stage provided by the derailleur. The speed indicator 20 is attached to the handlebar 3 to be readily visible to the rider though the shift levers 11 and 12 are disposed below the handlebar 3, which also facilitates confirmation of a selected speed stage. Further, in this embodiment, the speed indicator 20 is located in approximately the same direction as the shift levers 11 and 12 as seen in the rider's eyes. This is convenient in that the rider can see the indicator 20 and shift levers 11 and 12 at the same time. Where the indicator 20 lies between the pair of shift levers 11 and 12 as seen from the rider, the rider may look in the same direction to see the indicator 20 and shift levers 11 and 12.

Figure 6:
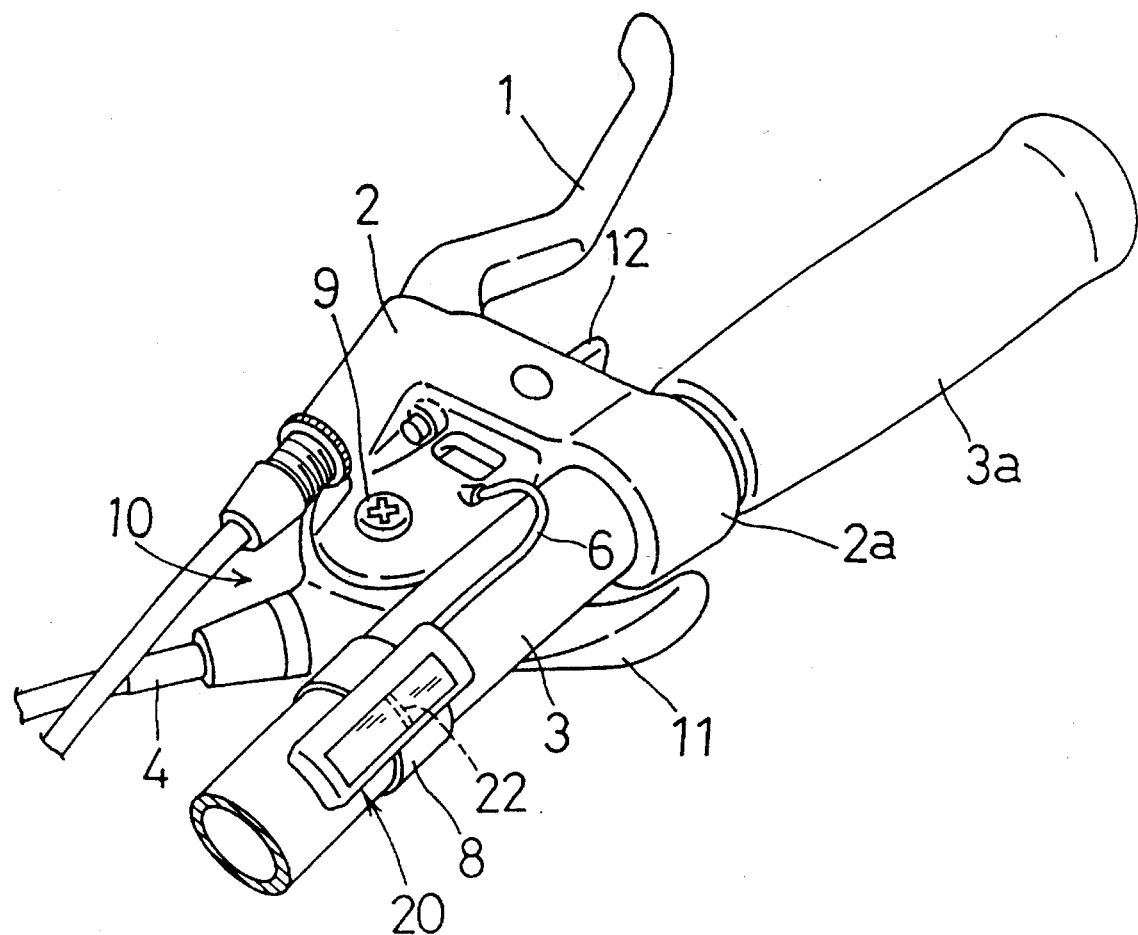
FIG. 6 is a perspective view of a modified speed indicator according to the present invention.

In the above embodiment, as shown in FIGS. 1 and 3, the speed indicator 20 is mounted on the lever bracket 2 which secures the shifter 10 to the handlebar 3. This construction has the advantage of allowing the shifter 10 and indicator 20 to be attached to the handlebar 3 in one operation though the two devices are formed independently of each other. However, the present invention may be embodied as shown in FIG. 6.

In this embodiment, the shifter 10 is attached to the handlebar 3 through the lever bracket 2, while the speed indicator 20 is attached to the handlebar 3 through a special mounting member 8. That is, the shifter 10 and indicator 20 are attached separately from each other to the handlebar 3.

Where the indicator 20 is shaped to extend circumferentially of the handlebar 3 as shown in FIGS. 1 and 3, the indicator 20 may advantageously be mounted on the handlebar 3 in a compact manner to project a minimal amount from the handlebar 3. Alternatively, the indicator 20 may be shaped to extend along the handlebar 3 as shown in FIG. 6, i.e. to extend longitudinally of the handlebar 3.

The speed indicator is not limited to the type having the slidable pointer as in the foregoing embodiments. The indicator may be the type in which the pointer is revolvable, or the type in which the pointer is fixed and the speed marks are movable. An electrical indicator may be employed.

The interlock cable may comprise a wire instead of the coil spring. Where the indicator is electrically operable, positions of the shift levers or takeup element are detected by a detection switch, and an electric cord is used for signal transmission purposes to operate the indicator based on detection results. Such cable, wire, cord and the like are called an interlocking device 5 herein.

The shifting device may include only one shift lever. The shift lever or levers may be directly connected to the takeup element. In this case, the speed indicator may be interlocked to the shift lever or levers to be operable in response to operation of the lever or levers.

In the described embodiments, the lever bracket is used for supporting the shifting device. Instead, a mounting bracket exclusive for the shifting device may be used to support the shifting device separately from the brake lever.

The technical concept of the present invention lies in forming a speed indicator independently of the main body of a shifting device, so that the indicator may be attached to a position of the handlebar easily seen by the rider regardless of the position of the shifting device on the handlebar. Thus, the indicator may be disposed at a certain height from the handlebar, using a prop or the like, and may be disposed adjacent a halfway position longitudinally of the handlebar.

What is claimed is:

1. A shifting apparatus for a bicycle comprising:

shift means attached to a handlebar of said bicycle, said shift means including a takeup member for winding a change speed wire thereon, and shift lever means for rotating said takeup member;

speed indicating means provided on said handle bar, said speed indicating means being formed separately from said shift means and attached to said handlebar; and interlock means, having a flexible member with one end fixed to said takeup member, for transmitting a displacement of said shift means to said speed indicating means by a sliding motion of said flexible member.

2. A shifting apparatus as defined in claim 1, wherein said shift lever means is disposed below said handlebar.

3. A shifting apparatus as defined in claim 1, further comprising a mounting member for securing said shift means to said handlebar, said speed indicating means being disposed on said mounting member.

4. A shifting apparatus as defined in claim 3, wherein said mounting member is a mounting band.

5. A shifting apparatus as defined in claim 3, wherein said speed indicating means has a substantially semicircular shape extending circumferentially of said handlebar.

6. A shifting apparatus as defined in claim 1, wherein said speed indicating means includes a transparent cover, a scale panel and a pointer.

7. A shifting apparatus as defined in claim 6, wherein said scale panel includes guide means, said pointer being slidable along said guide means.

8. A shifting apparatus as defined in claim 7, wherein said guide means is a pair of guide grooves extending circumferentially of said handlebar.

9. A shifting apparatus as defined in claim 6, wherein said pointer is T-shaped as a whole.

10. A shifting apparatus for a bicycle comprising:

shift means attached to a handlebar of said bicycle, said shift means including a takeup member for winding a change speed wire thereon, and shift lever means for rotating said takeup member;

speed indicating means formed separately from said shifting means and attached to said handlebar; and interlock means for transmitting a displacement of said shift means to said speed indicating means;

wherein said speed indicating means includes a transparent cover, a scale panel and a pointer; and wherein said speed indicating means extends along said handlebar, said pointer being movable along said handlebar.

11. A shifting apparatus for a bicycle comprising:

shift means attached to a handlebar of said bicycle, said shift means including a takeup member for winding a change speed wire thereon, and shift lever means for rotating said takeup member;

speed indicating means formed separately from said shifting means and attached to said handlebar; and interlock means for transmitting a displacement of said shift means to said speed indicating means;

wherein said shift lever means is disposed below said handlebar; and wherein said shift lever means is a pair of arms extending in different directions, said speed indicating means being disposed substantially between said pair of arms as seen from a rider on said bicycle.

12. A shifting apparatus for a bicycle comprising:

shift means attached to a handlebar of said bicycle, said shift means including a takeup member for winding a change speed wire thereon, and shift lever means for rotating said takeup member;

speed indicating means formed separately from said shifting means and attached to said handlebar; and interlock means for transmitting a displacement of said shift means to said speed indicating means;

wherein said speed indicating means includes a transparent cover, a scale panel and a pointer; and wherein said interlock means includes a flexible member extending between said takeup member and said pointer.

13. A shifting apparatus as defined in claim 12, wherein said interlock means further includes a cover surrounding said flexible member.

14. A shifting apparatus as defined in claim 13, wherein said flexible member is a coil spring.

15. A shifting apparatus attached to a handlebar of a bicycle comprising:

shift means attached to a handlebar of said bicycle, said shift means including a takeup member for winding a change speed wire thereon, and shift lever means disposed below said handlebar for rotating said takeup member;

a mounting member for attaching said shift means to said handlebar;

speed indicating means formed separately from said shifting means and attached to said handlebar; and interlock means for transmitting a displacement of said shift means to said speed indicating means.

16. A shifting apparatus as defined in claim 1, wherein said interlocking member further includes a cover surrounding said flexible member, wherein a diameter of said cover is substantially smaller than a diameter of a speed change wire.

* * * * *